(12) United States Patent
Zhang et al.

(10) Patent No.: US 7,812,849 B2
(45) Date of Patent: Oct. 12, 2010

(54) EVENT MEMORY ASSISTED SYNCHRONIZATION IN MULTI-GPU GRAPHICS SUBSYSTEM

(75) Inventors: Guofeng Zhang, Shanghai (CN); Xuan Zhao, Shanghai (CN)

(73) Assignee: VIA Technologies, Inc., Taipei (TW)

( * ) Notice: Subject to any disclaimer, the term of this patent is extended or adjusted under 35 U.S.C. 154(b) by 764 days.

(21) Appl. No.: 11/582,020

(22) Filed: Oct. 17, 2006

(65) Prior Publication Data

US 2007/0091099 A1  Apr. 26, 2007

Related U.S. Application Data

(60) Provisional application No. 60/727,668, filed on Oct. 18, 2005.

(51) Int. Cl.
G09G 5/399 (2006.01)
G06F 15/16 (2006.01)
G09G 5/36 (2006.01)
G09G 5/397 (2006.01)

(52) U.S. Cl. .............. 345/539; 345/504; 345/546; 345/545

(58) Field of Classification Search ............ 345/504, 345/537–539, 561, 563, 545, 546, 556, 639
See application file for complete search history.

(56) References Cited

U.S. PATENT DOCUMENTS

| | | | |
|---|---|---|---|
| 5,657,478 A * | 8/1997 | Recker et al. ............... 345/503 |
| 5,801,717 A | 9/1998 | Engstrom | |
| 5,933,155 A | 8/1999 | Akeley | |
| 6,243,107 B1 | 6/2001 | Valtin | |
| 7,383,412 B1 * | 6/2008 | Diard ............ | 711/170 |
| 7,388,581 B1 * | 6/2008 | Diard et al. ........ | 345/421 |
| 7,522,167 B1 * | 4/2009 | Diard et al. ........ | 345/502 |
| 7,545,380 B1 * | 6/2009 | Diard et al. ........ | 345/505 |
| 2005/0041031 A1 | 2/2005 | Diard ............ | 345/505 |

* cited by examiner

*Primary Examiner*—Kee M Tung
*Assistant Examiner*—Robert Craddock
(74) *Attorney, Agent, or Firm*—K&L Gates LLP

(57) ABSTRACT

A method and system are disclosed for synchronizing graphics processing events in a multi-GPU computer system. A master GPU renders a first image into a first portion of a master buffer associated with a display interface, and then writes a first predetermined value corresponding to the first image in a first memory unit. A slave GPU renders a second image into a slave buffer, and then transfers the second image to a second portion of the master buffer, and writes a second predetermined value corresponding to the second image in the first memory unit. The first and second predetermined values represent a queuing sequence of the rendered images. The master GPU flips the first image to display only after examining the first predetermined value in the first memory unit, and flips the second image to display only after examining the second predetermined value in the first memory unit.

14 Claims, 2 Drawing Sheets

EVENT MEMORY ASSISTED SYNCHRONIZATION IN MULTI-GPU GRAPHICS SUBSYSTEM

PRIORITY DATA

This application claims the benefits of U.S. patent application Ser. No. 60/727,668, which was filed on Oct. 18, 2005 and entitled "Smart CPU Sync Technology for MultiGPU Solution."

CROSS REFERENCE

This application also relates to U.S. patent application Ser. No. 60/727,635, which is commonly owned and filed with the present application and the content of which is incorporated by reference here in its entirety. This application also relates to U.S. patent application entitled "METHOD AND SYSTEM FOR DEFERRED COMMAND ISSUING IN A COMPUTER SYSTEM", and U.S. patent application entitled "TRANSPARENT MULTI-BUFFERING IN MULTI-GPU GRAPHICS SUBSYSTEM", and U.S. patent application entitled "METHOD AND SYSTEM FOR SYNCHRONIZING PARALLEL ENGINES IN A GRAPHICS PROCESSING UNIT", all of which are commonly filed on the same day, and which are incorporated by reference in their entirety.

BACKGROUND

The present invention relates generally to the synchronization of graphics processing in a computer system with multiple graphics processing units (GPUs), and, more particularly, to the timing of image rendering and flipping.

Modern computer systems often employ multiple graphics processing units (GPUs) to render images simultaneously, and these images are stored in multiple buffers. A particular GPU, often called master GPU, connects to a display driver. All the images are displayed from one or more buffers associated with the master GPU through a flip operation by a graphics driver. A flip is to turn a previously front buffer into a back one, and a previously back one into a front one. The so called 'front buffer' is a buffer currently supplying an image to the display driver, and the back buffer is one that is ready to receive an image either from rendering or from bit-block-transferring.

Bit-block-transfer (BLT) is to combine two image (e.g., bitmap) patterns from two buffers into one. Since only one master GPU do the flip, all other GPU are slaves. The images rendered by slave GPUs are eventually bit-block-transferred from their own buffers to the master buffers associated with the master GPU. The graphics driver also manages BLT timing and storage locations in the source as well as target buffers for the rendered and subsequently transferred images. The graphics driver can flip among any number of buffers, yet traditional double buffers remains to be the simplest for the driver to handle and hence most desirable. But in any case, the driver has to synchronize the flip, rendering and BLT, and for that, the traditional way of continuously checking the status of each and every component, i.e., GPUs, buffers, etc., is less efficient.

It is therefore desirable for a computer system to have a unified, and efficient way to synchronize these events.

SUMMARY

In view of the foregoing, this invention provides a method and system for monitoring the status of graphics processing events, such as rendering, flip, and BLT, and hence synchronizing the same.

To achieve the above objective, a method and system are disclosed for synchronizing graphics processing events in a computer system with multiple graphics processing units (GPUs). For example, a master GPU renders a first image into a first portion of a master buffer or a primary buffer associated with a display driver or display interface, and then writes a first predetermined value corresponding to the first image in a first memory unit. A slave GPU renders a second image into a slave buffer or a secondary buffer, and then transfers the second image to a second portion of the master buffer, and writes a second predetermined value corresponding to the second image in the first memory unit. The first and second predetermined value represent rendering over events of the images. The master GPU flips the first image to display after examining the first predetermined value in the first memory unit, and flips the second image to display only after examining the second predetermined value in the first memory unit.

The construction and method of operation of the invention, however, together with additional objects and advantages thereof will be best understood from the following description of specific embodiments when read in connection with the accompanying drawings.

DESCRIPTION

The operation of a computer system with multiple GPUs and their associated buffers are described in more detail in the U.S. Patent Application Ser. No. 60/727,635, which is filed with the present application and incorporated herein in its entirety. Detailed information with regard to the operation of the GPU in the computer system is further described in U.S. patent application entitled "METHOD AND SYSTEM FOR DEFERRED COMMAND ISSUING IN A COMPUTER SYSTEM", and U.S. patent application entitled "TRANSPARENT MULTI-BUFFERING IN MULTI-GPU GRAPHICS SUBSYSTEM", and U.S. patent application entitled "METHOD AND SYSTEM FOR SYNCHRONIZING PARALLEL ENGINES IN A GRAPHICS PROCESSING UNIT", all of which are commonly filed on the same day, and which are incorporated by reference in their entirety.

Figure 1:
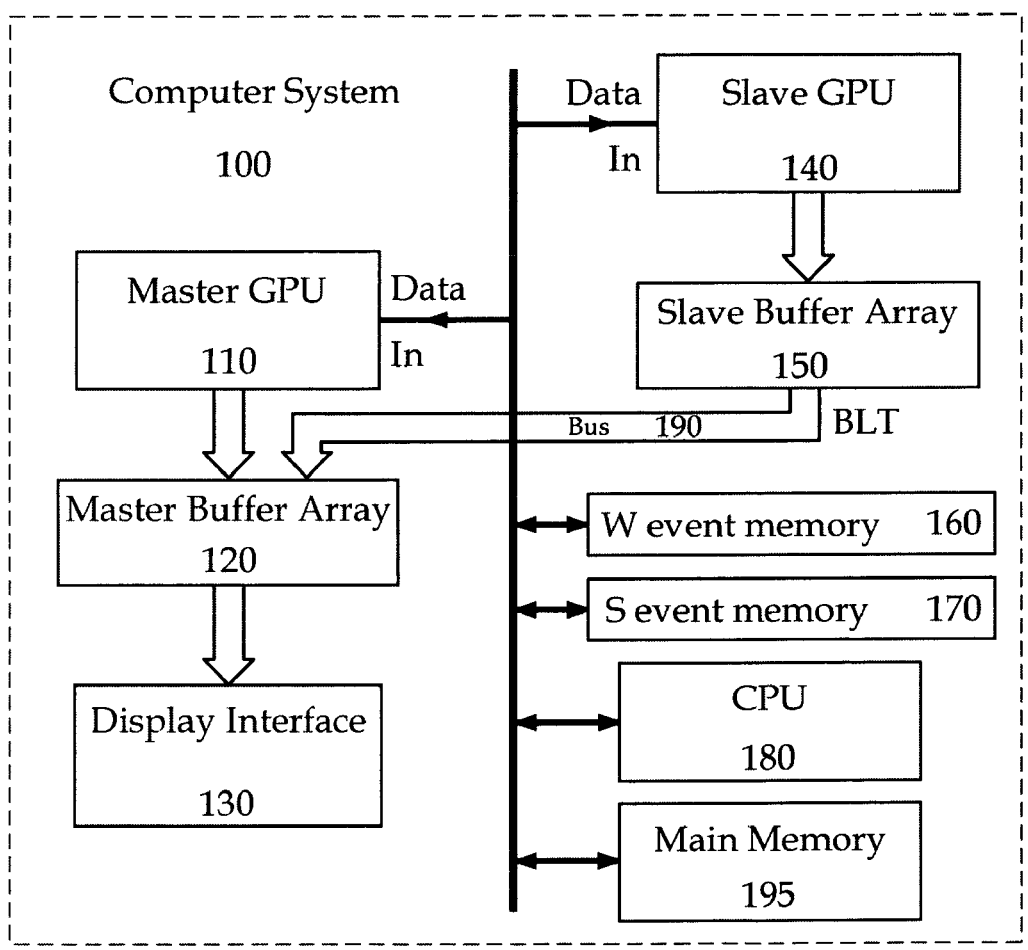
FIG. 1 is a block diagram of a part of a computer system with two graphics processing units (GPUs) and two event-memories according to one embodiment of the present invention.

FIG. 1 is a block diagram of a part of a computer system according to one embodiment of the present invention. The computer system 100 has two graphics processing units (GPUs) 110 and 140. The master GPU 110 renders images to a master buffer or a primary buffer 120, which is connected with a display interface 130. Images stored, or queued in the master buffer 120 are flipped to the display interface 130 sequentially. The slave GPU 140 independently renders images to a slave buffer or secondary buffer 150. It is understood that the buffers can be buffer arrays or any other forms of memory unit arrangements. The master and slave GPUs render images alternatively, i.e., if the master GPU renders a frame[i], then the slave GPU 140 renders a frame[i+1], and next the master GPU renders a frame[i+2], and so on and so forth. To transfer images in the slave buffer 150 to the master buffer 120, Master GPU 110 or Slave GPU 140 initiates bit-block-transfers (BLT) through a bus 190 at certain time, so that all the rendered images are queued in the master buffer 120 in the same sequence as they are rendered.

According to one embodiment of the present invention, the flip operation is carried out by memory-mapped I/O, or MMIO. That is, the display device displays the image in a specified buffer immediately after CPU writes the related registers in the GPU, which are memory mapped.

To facilitate the synchronization of the events of rendering, flip and BLT by various components of the computer system, two event memories, W event memory 160 and S event memory 170, are allocated according to one embodiment of the present invention.

In one embodiment of the present invention, GPUs updates W event memory 160. Whenever finishing a rendering job, the master GPU 110 increments the value of W event memory 160. Similarly, whenever the slave GPU 140 completes a BLT, it also writes an incremental value into the W event memory 160. By checking on the value of W event memory 160 during every command cycle, the CPU 180 can determine whether or not a certain image is completely rendered and ready to be flipped. Note that the W memory has different portions for different GPUs. Following is an exemplary subroutine of pseudo codes, named "queued-flip", for CPU 180 to check and flip the queued images in the master buffer 120.

```
While (queued-flip)
{
    get the first flip
    if (tracked W event value not back)
        break;
    do FLIP through MMIO
    write an incremental S event value to the S event memory
    Remove current flip
}
```

Note that following a flip in the above queued-flip subroutine, the CPU 180 writes an incremental S event value to the S event memory 170, which means a queued image has been flipped and the master buffer 120 can accept a new image. So by checking on the value of the S event memory, the CPU can determine whether or not it can let GPUs render or BLT a new image into the master buffer 120 for queuing.

However, if the master-buffer 120 is so large that a new rendering is guaranteed not to overwrite an un-flipped queued image, then checking or even allocating the S event memory becomes unnecessary.

Figure 2:
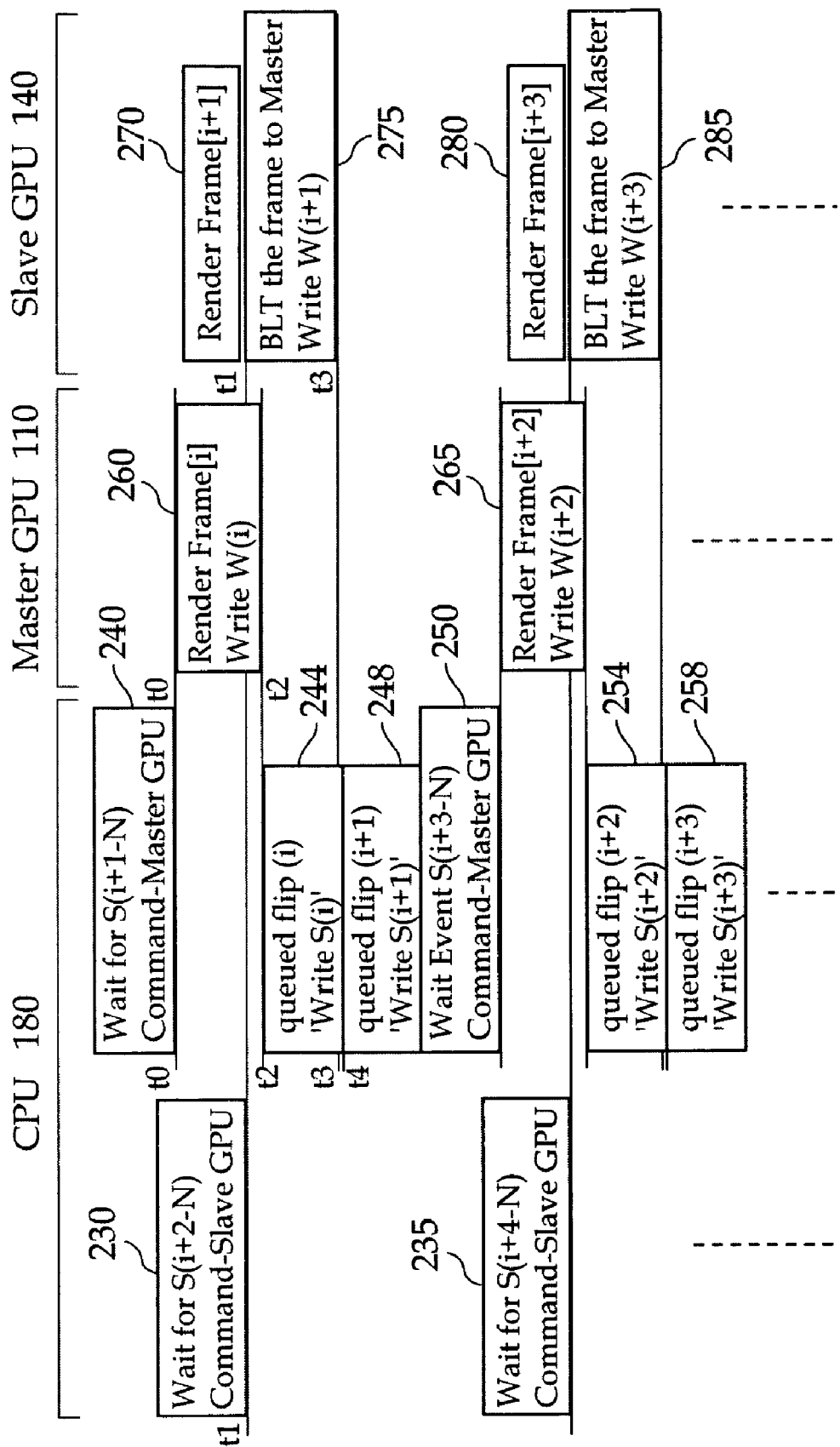
FIG. 2 is a timing diagram of the computer system according to one embodiment of the present invention.

FIG. 2 is a timing diagram detailing how event-memories assist the synchronization of rendering, flip and BLT events in a duo GPU system. Refer to both FIGS. 1 and 2, and it is assumed that the master 110 and slave 140 GPUs both have N number of elements. Every time before issuing a rendering command to the master GPU 110, the CPU 180 checks S event memory 170, and a new rendering command is only issued in a time slot 240, when the value of the S event memory 170 reached i+1-N, which means N number of buffered images prior to the current one have been flipped and the buffer is ready to accept a new rendering without overwriting a previously rendered and queued image. Here "i" is an index representing a current command cycle. A frame of image is rendered in every command cycle.

Upon receiving a rendering command from the CPU 180, the master GPU 110 starts to render frame[i] in a time slot 260. When the rendering is done, the master GPU 110 writes the value i into a W event memory also in the time slot 260.

The slave GPU 140 operates differently. Its rendering is rather independent, and it can render a subsequent frame[i+1] in a time slot 270, which overlaps the time slot 260 when the master GPU 110 is rendering the frame[i]. But bit-block-transferring (BLT) the slave-GPU-rendered image, frame[i+1], to the master buffer 120 in a time slot 275 needs to make sure that the value of S event memory passes i+2-N, i.e., more than N number of frames prior to the frame[i+1] have been flipped, and the master buffer is ready to accept a new rendering. As shown in FIG. 2, the time slot 275 is after a time slot 230. In the time slot 230, the CPU 180 issues a BLT command to the slave GPU 140 after the value of S event memory passes i+2-N. Upon the completion of the BLT command, the slave GPU 140 also writes an incremental value i+1 to the W event memory in the time slot 275.

When executing the subroutine, queued-flip (i+1), in a time slot 244, the CPU 180 first checks the value of W event memory 160. If the value, i+1, is already in the W event memory 160, which means that the frame[i+1] is already queued in the master buffer 120, then it flips the frame[i+1], and writes a value i+1 to S event memory. These steps are also stated in the above queued-flip subroutine.

In essence, the CPU 180 flips a queued image in the master buffer 120 after a value corresponding to the queued image is in the W event memory 160, and writes an incremental value in S event memory at the end of the flip. Meanwhile, the GPUs render or BLT images to be queued in the master buffer 120, and writes an incremental value in the W event memory 160 upon a completion of rendering by the master GPU 110 or transferring by the slave GPU 140. In this way, the synchronization of the flip, rendering and bit-block-transfer in a computer graphics subsystem is simplified.

This invention provides many different embodiments, or examples, for implementing different features of the invention. Specific examples of components and methods are described to help clarify the disclosure. These are, of course, merely examples and are not intended to limit the disclosure from that described in the claims.

What is claimed is:

1. A method for performing flip synchronization for a computer system having multiple graphics processing units comprising:

associating each image queued in a master buffer with a first event value and a second event value, wherein the first and the second event values represent a status before and after each image queued in the master buffer is flipped, respectively;

generating a master-GPU-rendered image by rendering a first image by a master GPU;

storing the master-GPU-rendered image in a first portion of the master buffer and incrementing the first event value corresponding to the master-GPU-rendered image in the master buffer;

generating a slave-GPU-rendered image by rendering a second image by a slave GPU;

storing the slave-GPU-rendered image in a slave buffer;

transferring the slave-GPU-rendered image to a second portion of the master buffer to be stored in sequence to the first portion of the master buffer and incrementing the first event value corresponding to the slave-GPU-rendered image in the master buffer;

issuing a flip command to flip the master-GPU-rendered image and the slave-GPU-rendered image in the master buffer upon determining the first event value corresponding to the slave-GPU-rendered image is incremented; and incrementing the second event value corresponding to the slave-CPU-rendered image in the master buffer upon execution of the flip command.

2. The method of claim 1, further comprising:

withholding from issuing the flip command if the first event value corresponding to the slave-GPU-rendered image is not incremented.

3. The method of claim 1, further comprising:

issuing one or more rendering commands to the master GPU and the slave GPU in a predetermined sequence.

4. The method of claim 1, wherein the transferring step is executed in response to a bit-block-transfer (BLT) command.

5. The method of claim 1, wherein the transferring step is executed in response to a memory-mapped I/O (MMIO) flip command.

6. The method of claim 1, further comprising:

issuing a render command to the master GPU when determining the second event value corresponding to the slave-GPU-rendered image is incremented.

7. A computer system for performing flip synchronization comprising:

a master buffer coupled to a display for queuing rendered images to be displayed;

a first event memory for storing a first event value indicating a status before each of rendered images queued in the master buffer is flipped;

a second event memory for storing a second event value indicating a status after each of rendered images queued in the master buffer is flipped;

a master GPU coupled to the master buffer for generating a rendered first image and incrementing the first event value corresponding to the rendered first image upon storing the rendered first image in a first portion of the master buffer;

a slave buffer coupled to the master buffer for storing a rendered second image and transferring the rendered second image to the master buffer;

a slave GPU coupled to the slave buffer for generating the rendered second image and incrementing the first event value corresponding to the rendered second image upon storing the rendered second image to a second portion of the master buffer upon execution of a flip command; and a CPU coupled to the master buffer for issuing the flip command to flip the rendered first image and the rendered second image in the master buffer upon determining the first event value corresponding to the rendered second image is incremented.

8. The computer system as claimed in claim 7, wherein the CPU withholds from issuing the flip command if the first event value corresponding to the rendered second image is not incremented.

9. The computer system as claimed in claim 7, wherein the CPU issues one or more rendering commands to the master GPU and the slave GPU in a predetermined sequence.

10. The computer system as claimed in claim 7, wherein the rendered second image is transferred to the master buffer in response to a bit-block-transfer (BLT) command from the CPU.

11. The computer system as claimed in claim 7, wherein the rendered second image is transferred to the master buffer in response to a memory-mapped I/O (MMIO) flip command from the CPU.

12. The computer system as claimed in claim 7, wherein the first event memory and the second event memory are system memory.

13. The computer system as claimed in claim 7, wherein the second portion of the master buffer is in sequence to the first portion of the master buffer.

14. The computer system of claim 7, further comprising:

a bus coupled to the master buffer and the slave buffer for transferring the rendered second image from the slave buffer to the master buffer.

* * * * *